(12) United States Patent
Mittal et al.

(10) Patent No.: US 10,698,824 B1
(45) Date of Patent: Jun. 30, 2020

(54) SCALABLE COHERENCE MANAGEMENT INDEPENDENT OF TRANSPORT PROTOCOL

(71) Applicant: Xilinx, Inc., San Jose, CA (US)

(72) Inventors: Millind Mittal, Saratoga, CA (US); Jaideep Dastidar, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 95 days.

(21) Appl. No.: 16/141,704

(22) Filed: Sep. 25, 2018

(51) Int. Cl.
*G06F 3/00* (2006.01)
*G06F 12/0815* (2016.01)

(52) U.S. Cl.
CPC .. *G06F 12/0815* (2013.01); *G06F 2212/1032* (2013.01); *G06F 2212/608* (2013.01)

(58) Field of Classification Search
None
See application file for complete search history.

(56) References Cited

PUBLICATIONS

Goodman, James, "Source Snooping Cache Coherence Protocols," Nov. 6, 2009, pp. 1-59, University of Auckland, Computer Science Department, Auckland, New Zealand.
Intel, "An Introduction to the Intel® QuickPath Interconnect," Document N. 320412-0001US, Jan. 2009, pp. 1-22, Intel Corp., Santa Clara, California, USA.

*Primary Examiner* — Henry Tsai
*Assistant Examiner* — Dean Phan
(74) *Attorney, Agent, or Firm* — Crawford Maunu PLLC

(57) ABSTRACT

Disclosed systems and methods include in each agent, an agent layer, a link layer, and a port layer. The agent layer looks-up a port identifier in an address-to-port identifier map in response to a request directed to another agent and submits the request to the port layer. The link layer includes a plurality of links, and each link buffers communications from and to the agent layer. The port layer looks-up, in response to the request from the agent layer, a link identifier and chip identifier and writes the request to one of the links identified by the link identifier and associated with the chip identifier. The port layer also reads requests from the links and submits communications to a transport layer circuit based on the requests read from the links and associated chip identifiers.

20 Claims, 8 Drawing Sheets

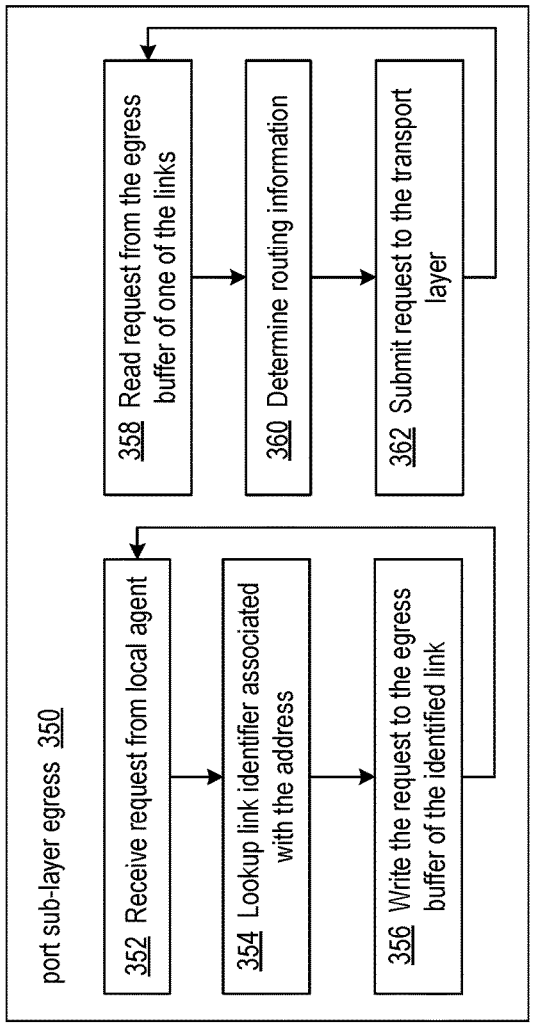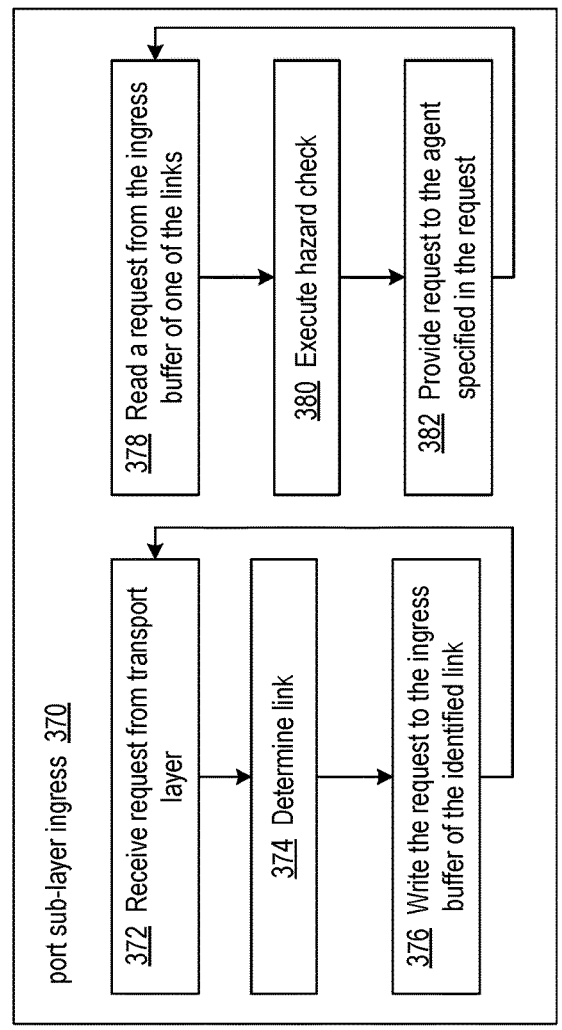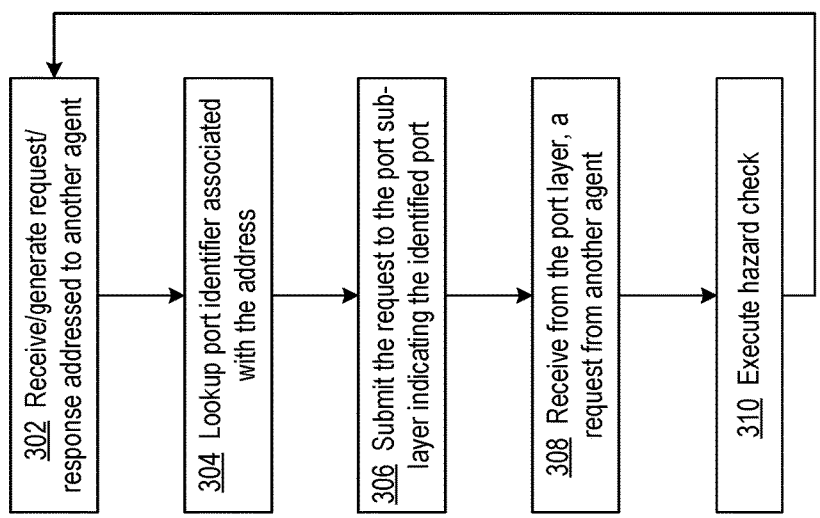

US 10,698,824 B1

SCALABLE COHERENCE MANAGEMENT INDEPENDENT OF TRANSPORT PROTOCOL

TECHNICAL FIELD

The disclosure generally relates to approaches for maintaining coherent memory independent of a transport protocol.

BACKGROUND

Cache coherency protocols typically require same-address ordering between operations/events from multiple agents to that address in order to maintain hardware-enforced functional correctness. A set of serialization rules and ordering rules triggered by address-hazard detection are also necessary when multiple agents concurrently act on a single cache line. A cache line is an example of a "coherency unit" or "quantum." The set of serialization rules, which are conventionally enforced by a physical transport, also necessitate a common set of routing rules between agents on the network so that operations/events executed in a temporal order at a source follow the same route in order to reach the destination in the same temporal order.

Coherency protocols also allow for coherency actions from multiple agents, while maintaining functional correctness via serialization and hazard detection. Since hardware-enforced cache-coherency is transparent to software, multiple agents can act on the same coherency-unit, with hardware guaranteeing a functionally correct outcome. The in-order requirements for serialization and hazard detection, concurrent with coherency actions from multiple agents, can create logical and resource dependency loops and hence require that coherency protocols also have built in deadlock avoidance mechanisms.

SUMMARY

A disclosed circuit arrangement includes in each agent of a plurality of agents, an agent layer, a link layer, and a port layer. The agent layer is configured to look-up a port identifier in an address-to-port identifier map in response to a request directed to another agent layer. The request includes an address and an agent identifier of the other agent layer. The agent layer further submits the request to the port layer. The link layer includes a plurality of links, and each link is configured to buffer communications from and to the agent layer. The port layer is coupled to the agent layer and to the link layer. The port layer is configured to look-up, in response to the request, a link identifier and chip identifier in an address-to-link map associated with the port identifier. The port layer is further configured to write the request to one of the links identified by the link identifier and associated with the chip identifier, read requests from the links, and submit communications to a transport layer circuit based on the requests read from the links and associated chip identifiers.

A disclosed method includes establishing on each agent of a plurality of agents in a cache coherence network, a respective, dedicated link for buffering cache coherence communications between the agent and each other agent with which the agent exchanges cache coherence communications. Memory access requests are issued by respective agent layers of request agents of the plurality of agents to a home agent of the plurality of agents via the dedicated links. A snoop request is issued to the dedicated link for a request agent of the plurality of agents, by an agent layer of a home agent of the plurality of agents, in response to detecting a cache coherence hazard involving the request agent. Cache coherence communications are received by respective port layers of the plurality of agents, from transport layer circuitry of each of the plurality of agents, and cache coherence communications to and from the links are serialized by the respective port layers. The method attaches transport layer identifiers to cache coherence communications by the respective port layers, and the respective port layers submit cache coherence communications to the transport layer circuitry of the plurality of agents. An updated value is returned from a respective agent layer of a request agent of the plurality of agents to a home agent via the dedicated link in response to detecting a cache coherence hazard from a snoop request.

Another disclosed method includes looking-up a port identifier in an address-to-port identifier map by an agent layer in response to a request directed to another agent layer. The request includes an address and an agent identifier of the other agent layer. The agent layer submits the request to a port layer, and communications from and to the agent layer are buffered in links of a link layer. The port layer looks-up, in response to the request, a link identifier and chip identifier in an address-to-link map associated with the port identifier and writes the request to one of the links identified by the link identifier and associated with the chip identifier. The port layer reads requests from the links by the port layer and submits communications to a transport layer circuit based on the requests read from the links and associated chip identifiers.

Other features will be recognized from consideration of the Detailed Description and Claims, which follow.

BRIEF DESCRIPTION OF THE DRAWINGS

Various aspects and features of the system and method will become apparent upon review of the following detailed description and upon reference to the drawings in which:

FIG. 3 shows a flowchart of an exemplary process performed by an agent sub-layer of an agent;

FIG. 4 shows a flowchart of processes performed by the port sub-layer in processing egress requests;

FIG. 5 shows a flowchart of processes performed by the port sub-layer in processing ingress requests;

DETAILED DESCRIPTION

Figure 1:
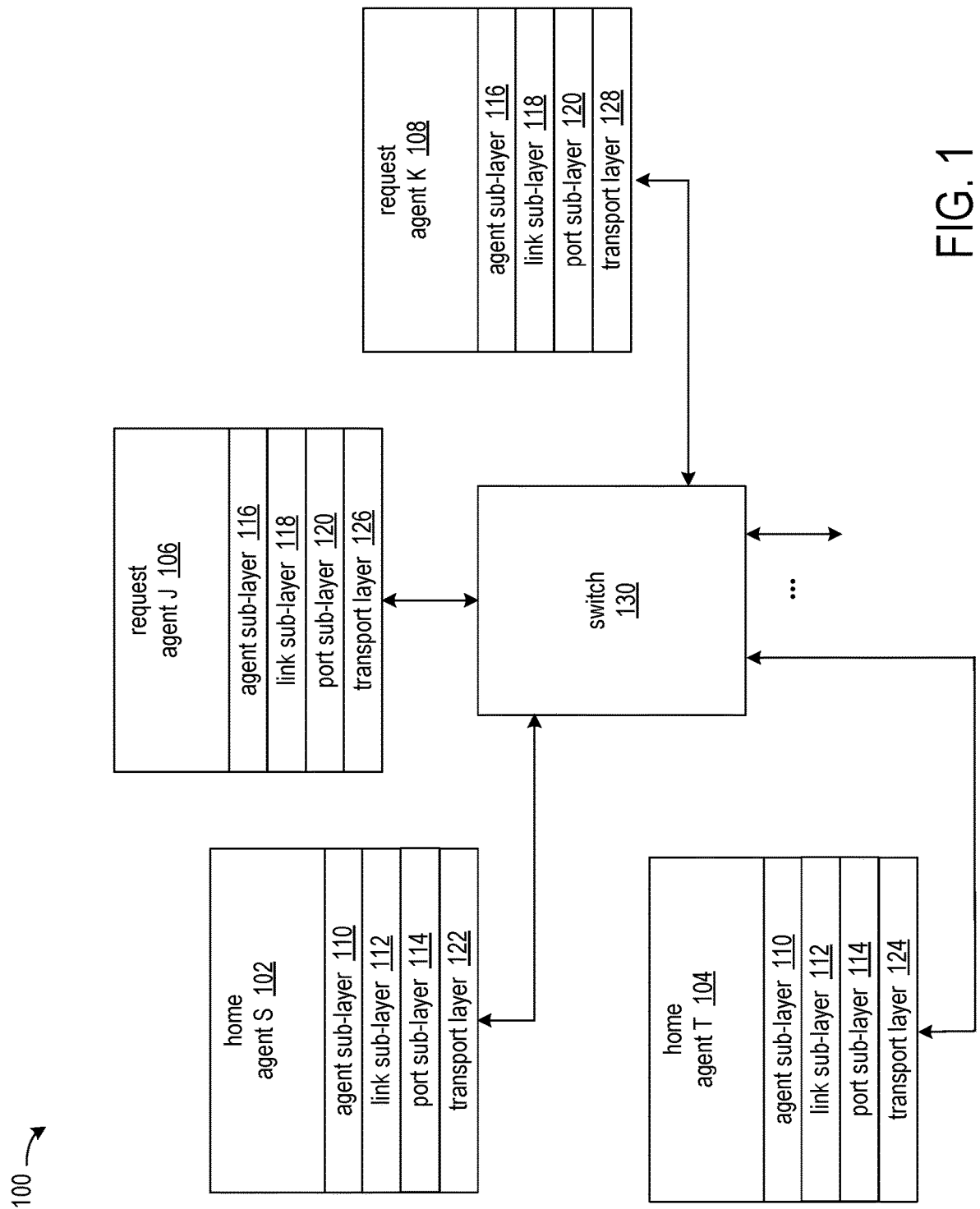
FIG. 1 shows a system and circuit arrangement and the constituent sub-layers of the coherency layer in the agents of an exemplary system.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

In a departure from prior approaches, the disclosed circuits and methods implement coherency semantics in a layer separate from the transport layer over which coherency transactions are carried. In prior approaches, the actions/opcodes/commands of the coherency protocol are implemented in the actions/opcodes/commands of the transport protocol. For example, coherency protocol unicast, multicast and broadcast semantics are implemented as transport protocol unicast, multicast and broadcast transactions. In prior approaches, the topology, flow control, deadlock avoidance mechanisms, and routing attributes of the coherency protocol are the topology, flow control, deadlock avoidance mechanisms, and routing attributes implemented by the transport protocol. For example, coherent agent-to-agent communication use transport protocol source/destination identifiers, agent-to-agent flow control relies on transport protocol flow control, and routing from agent-to-agent relies on the routing data structures of the transport protocol.

The disclosed systems and methods implement a distinct coherency layer that does not use coherency actions/opcodes/commands or topology, flow control, or deadlock avoidance of the transport layer. The coherency layer, having agent, link, and port sub-layers, provides improvements in adaptability, scalability and performance. The coherency layer is adaptable to new features and capabilities without necessarily impacting the transport layer. For example, the coherency layer can be overlaid on the Peripheral Component Interconnect Express (PCIe) transport protocol but is adaptable to the GenZ transport protocol with no impact to the PCIe transport protocol. The coherency layer is adaptable to new topologies without requiring support from the transport layer. For example, the coherency layer can be overlaid on the PCIe tree topology but create its own mesh topology between coherency layer agents without requiring that the PCIe transport protocol also support a mesh topology. Each of the sub-layers of the coherency layer is readily adaptable to new features and capabilities without impacting the other sub-layers. For example, the port sub-layer can be easily adapted to new transport and routing protocols for port-to-port communication, such as migrating from PCIe tree topologies to mesh and hypercube topologies, while the agent and link sub-layers remain unaffected.

The coherency layer is scalable without requiring comparable scaling of the transport layer. For example, the coherency layer resources and associated flow control credits can be increased for agent-to-agent communication without requiring that the increases in resources and associated flow control credits of the transport layer. Each sub-layer of the coherency layer can be independently scaled up or down without impacting the other sub-layers. For example, the number of request agents can be increased or decreased independent of the number of home agents. Additional request agents can be supported by concurrent compute engines that operate over shared memory controlled by additional home agents. Additional home agents can support an increased size of coherent shared memory. The number of request agents and home agents can be increased without impacting the port sub-layer or the link sub-layer.

The number of request agents or home agents serviced by a port sub-layer can be increased or decreased without impacting the algorithm implemented by the port sub-layer. The opposite is also possible. The ports in service of a request agent or home agent can be increased or decreased without impacting the algorithm implemented by the agent sub-layer. Also, the number of ports can be increased or decreased without impacting the algorithm implemented by the link sub-layer executing over each port.

The agent, link, and port sub-layers and independent execution of the algorithms implemented by the sub-layers offer improved performance by way of scaling without a corresponding slowdown in the performance of the individual sub-layers.

Particular implementations allow multiple agents on one on-chip interconnect to achieve coherent operations/events and deadlock avoidance with multiple agents on another, different, on-chip interconnect. "Chip" as used herein refers to a semiconductor die. Coherent operations/events can be achieved over a coherency layer network that is independent of the type of physical transport. The coherency layer network also provides coherency over multiple physical transports and/or between on-chip interconnects. Deadlock avoidance provided by the coherency layer network does not rely on any deadlock avoidance native to the physical transport. The coherency protocol routing attributes are independent of the routing attributes of the physical transport network over which the coherency semantics operations/events are achieved. System address map (SAM) and ID Map (IDM) circuits provide the semantic coherency routing attributes for address routed and ID-routed packets respectively.

The coherency actions can include globally ordering requests from multiple agents to a single coherency unit, detecting address hazards for requests from multiple agents to a single coherency-unit, and implementing deadlock avoidance.

The port sub-layer serializes coherency actions of multiple agents of a common physical transport. For example, the serialization by the port sub-layer supports address hazard detection of a write-back operation from a request agent to a home agent with a snoop operation from the same home agent to that request agent.

The link sub-layer provides dedicated link buffers between groups of agents. Each link buffer is associated with transport resources unique to the group of agents associated with the link buffer, and each link buffer provides a channel unique to agents in the group. The dedicated link buffers provide a mechanism for avoiding deadlock due to circular dependencies between coherency operations between one group of agents and another group of agents.

Each port of the port sub-layer can have multiple associated link buffers. Association of multiple link buffers with a port supports multiple deadlock-free connections over a single physical transport, even if the physical transport provides a single connection between the groups of agents.

Each link buffer supports serialization (a temporal ordering) of coherency actions between groups of agents even if the coherency actions travel over multiple physical transport hops and/or over multiple transport protocols. As each link buffer provides a dedicated channel to an agent or a group of agents, deadlock avoidance is furthered by separating dependent operations between multiple groups of agents. An example in the Cache Coherent Interconnect for Accelerators (CCIX) protocol, is separation of transport for request agent to home agent and home agent to slave agent operations. Lack of such separation can result in a dependency loop, and deadlock.

The coherency agent layer of one logical source agent handles coherency actions and serialization of those actions representing one or more physical source agents to a logical destination agent representing one or more physical destination agents. An example of a logical agent is a logical home agent that is performing both the coherency actions as well as the deadlock avoidance methods on behalf of multiple physical home agents. This scenario is an example in which an increase in the size of coherent shared memory does not necessitate an increase in the number of home agents. The multiple physical home agents manage respective coherent shared memory footprints whereas the single logical home agent follows the coherency protocol and protocol related operations with all request agents seeking shared memory from that home agent. Similarly, multiple processing units can constitute multiple physical request agents with the one logical request agent following the coherency protocol and protocol related operations with the home agent(s). The source agents can be on one on-chip interconnect protocol and the destination agents can be on another on-chip interconnect protocol. The coherency agent layer can rely on the coherency port layer and associated link buffer for maintaining temporal order for traffic from/to that agent.

Though the disclosed system and methods primarily describe an exemplary implementation having a distinct separation between the port, link, and agent layers, in other implementations selected functions can be merged across these layers. Functions can be merged across layers for practical reasons, with compromises in one or more of the adaptability, scalability and performance benefits that implementations having distinct layers would provide. The implementation having merged functions would continue to achieve the overall function of the coherency layer, and continue to maintain independence from the transport protocol.

FIG. 1 shows a system and circuit arrangement and the constituent sub-layers of the coherency layer in the agents of system 100. The system 100 includes multiple agents, examples of which are shown as agents 102, 104, 106, and 108. Each agent is implemented as an ASIC, software executing on a processor circuit, a circuit implemented in programmable logic circuit or a combination of the foregoing circuits. An agent can be implemented on single IC die or an IC package.

The coherency layer (not shown) in each agent includes an agent sub-layer, a link sub-layer, and a port sub-layer. In home agents S and T (HA-S and HA-T) 102 and 104, the sub-layers are shown as agent sub-layer 110, link sub-layer 112, and port sub-layer 114. In request agents J and K (RA-J and RA-K) 106 and 108, the sub-layers are shown as agent sub-layer 116, link sub-layer 118, and port sub-layer 120. The agent sub-layer provides an interface for application circuitry (not shown) to initiate memory access requests. The port sub-layer uses the link sub-layer to buffer requests and responses to be output to and input from the transport layer. In an exemplary implementation, the algorithms of the agent, link, and port sub-layers implement a cache coherence protocol. In other implementations, the agent, link, and port sub-layers can enforce load-store semantics or memory expansion semantics. Load-store semantics and memory expansion semantics employ a subset of the cache coherency actions described herein. The algorithms performed by as well as other aspects of the sub-layers can be implemented as application-specific integrated circuitry (ASIC), programmable logic circuitry, software executing on a processor or any combination of the foregoing. Thus, the sub-layers themselves are circuits of the types mentioned.

The agent sub-layer 116 of a request agent responds to memory access requests from local processing circuitry, such as on-chip or in-package circuits or processors. The access request includes an address and a code that indicates the type of request, for example, read, write etc. The agent sub-layer 110 in home agents 102 and 104 respond to coherence requests received from request agents. Each home agent can be assigned and responsible for managing a range of memory addresses, and the agent sub-layer of each request agent can be configured to recognize which home agent is responsible for which range of memory addresses.

The agent sub-layers prepare requests to other agent sub-layers. The agent sub-layer 110 of a home agent 102, 104 prepares requests to agent sub-layers 116 of requests agents 106, 108, and request agents prepare requests to home agents. Each request from an agent sub-layer includes a memory address, a code indicating the type of memory access, and identifiers of source agent ("source ID") and the destination agent ("destination ID"). In processing a request directed to another agent, the agent sub-layer looks up a port identifier in an address-to-port identifier map and submits the request to the identified port of the port sub-layer 114, 120 as identified by the port identifier.

Each link sub-layer 112 and 118 generally includes multiple links (or "channels"). Each channel is configured to buffer communications from and to one or more agents of the agent sub-layer 110, 116. Each channel includes an ingress buffer (not shown) and an egress buffer (not shown). The ingress buffer temporarily stores requests received from the transport layer 122, 124, 126, 128, and the egress buffer temporarily stores requests to be sent over the transport layer.

Each port sub-layer 114, 120 provides an interface between the transport layer 122, 124, 126, 128 of the agent and the respective agent sub-layer through the link sub-layer 112, 118 of the agent. In response to a request made from the local agent sub-layer, the port sub-layer looks-up in an address-to-link map (not shown), the link identifier and chip identifier associated with the address in the request. The port sub-layer writes the request to the channel identified by the link identifier. In response to a request received from the transport layer, the port sub-layer writes the request to the channel associated with the destination agent identified in the request. Each port sub-layer is also configured to read requests from ingress buffers of the channels and provide the requests to the agent-sublayer. Each port sub-layer is also configured to read requests from the egress buffers of the channels and submit the requests to the transport layer.

The port sub-layer 114, 120 can be configured to support strongly-ordered or weakly-ordered (or "loosely-ordered") semantics. For strongly-ordered semantics, the port sub-layer can write to and read from each ingress buffer and each egress buffer in first-in-first-out (FIFO) order. For loosely ordered semantics, architected barrier requests can be used act as a barrier to force ordered execution of two out-of-order groups of transactions.

Transport layers are also shown as components of each of the agents. The coherency port sub-layers in the agents 102, 104, 106, and 108 interface with the respective transport layers 122, 124, 126, and 128, and the transport layers are communicatively coupled to the switch 130. The transport layers and switch can implement any communications protocol suitable for the intended application of system 100. For example, in an exemplary application, the switch provides point-to-point communications between the agents, and the transport layer can implement a PCIe protocol.

Figure 2:
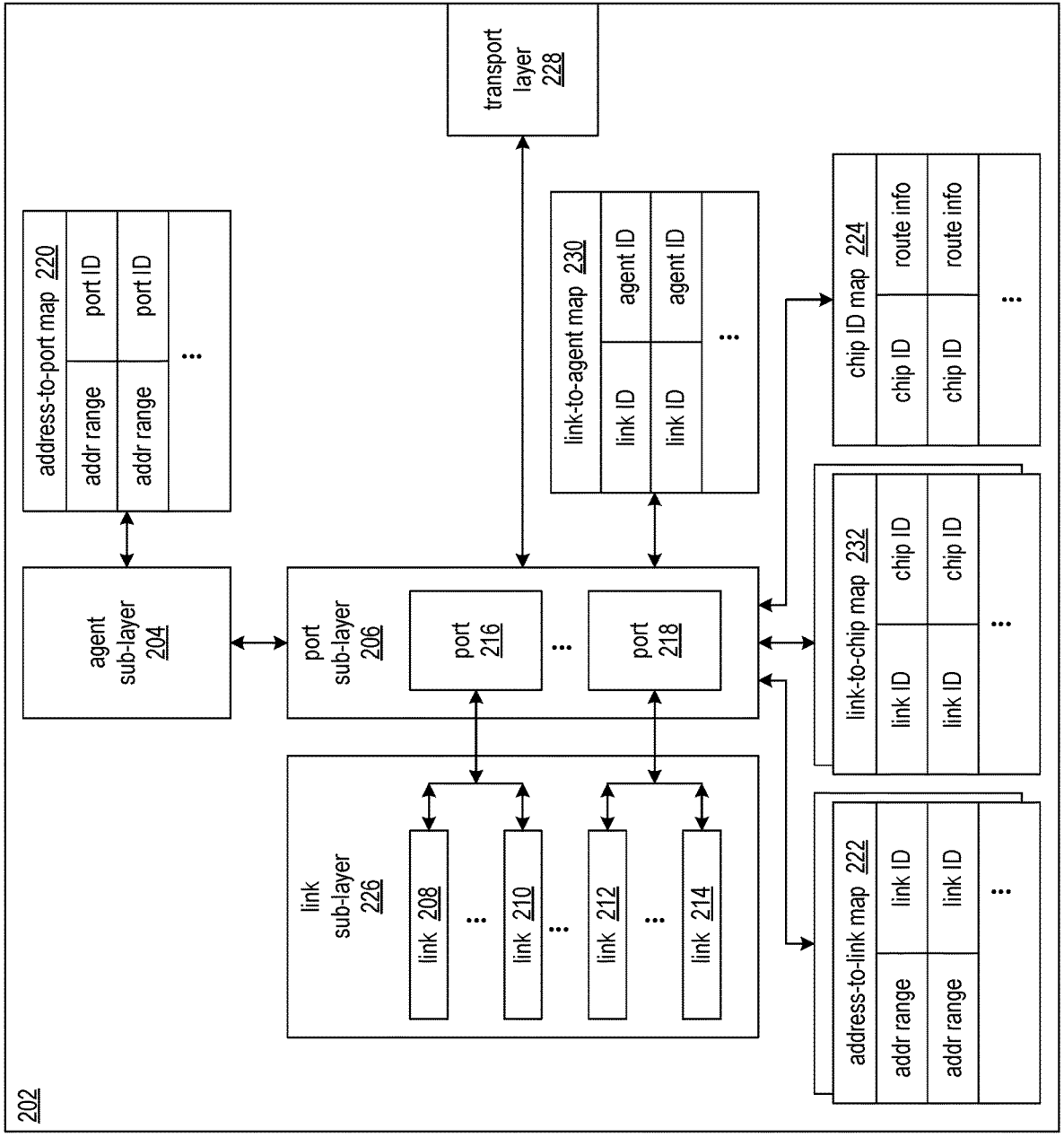
FIG. 2 shows an exemplary agent, which can be a request agent or a home agent.

FIG. 2 shows an exemplary agent 202, which can be a request agent or a home agent. The agent sub-layer 204 is coupled to an address-to-port map 220 and to the port sub-layer 206. The port sub-layer is coupled to the link sub-layer 226, address-to-link maps 222, chip ID map 224, and transport layer 228. The maps 220, 222, and 224 can be implemented as content addressable memories, for example.

In one implementation, each link 208, ..., 210, 212, ..., 214 in the link sub-layer 226 can be configured to buffer communications between the agent sub-layer 204 and one and only one other agent sub-layer of another agent. In other implementations, a link can be configured and dedicated to buffer communications between one group of agent sub-layers and another group of agent sub-layers. The groups can be defined to share common property, such as a source group of request agents (i.e., agents are of the same type) on one device and a destination group of home agents. An agent sub-layer can implement a request/home agent on a single physical circuit or can implement a logical group of request/home agents on one or more physical circuits sharing the same coherency property. The one or more physical circuits that implement the one or more request/home agents occupy a single IC die or a package of multiple dice.

The port sub-layer can implement multiple ports 216, ..., 218, and the agent sub-layer 204 uses the address-to-port map 220 to determine which port to indicate to the port sub-layer the request should be directed. Each port 216, ..., 218 can be associated with one or more links/channels in the link sub-layer. For example, port 216 is associated with links 208, ..., 210, and port 218 is associated with links 212, ..., 214. Each of the ports is associated with one of the address-to-link maps 222, and the port sub-layer in response to request from the agent sub-layer 204, looks-up in the associated address-to-link map, the link ID associated with the address in the request.

Each of the ports is also associated with one of the link-to-chip maps 232. After obtaining the link ID from the address-to-link map 222, the port sub-layer looks-up the associated chip ID in the link-to-chip map of that port. The chip ID is appended to the outbound request. The port sub-layer then writes the request to the egress buffer (not shown) in the identified link.

The port sub-layer 206 also reads requests from the egress buffers (not shown) of the links 208, ..., 210, 212, ..., 214 associated with the ports 216 and 218 and submits the requests to the transport layer. Before submitting a request to the transport layer, the port sub-layer determines routing information for the request. In an exemplary implementation, the system can be deployed on multiple chips, and requesters can be implemented on different ones of the chips. The chip ID can be determined by the port sub-layer from the address-to-link map 222, either before the request is written to a link or after a request is read from a link. The port sub-layer determines the routing information associated with the chip ID from the chip ID map 224 and submits the request along with the determined routing information to the transport layer. The port sub-layer can service the ports and links in round-robin order, for example, or any other order suitable for the intended application. The port sub-layer can also service ports independently of each other, thus achieving concurrent, out-of-order behavior.

The port sub-layer 206 also processes requests/responses received from the transport layer 228. The port sub-layer determines the port and link to be used for an incoming request as follows. For determining the port, there can be a 1:1 relationship between the coherency layer/port and the transport layer/port. That is, the traffic egressing/ingressing through a transport layer port can have exactly one coherency layer port through which that same traffic is egressing/ingressing. Thus, determination of the coherency layer port for incoming requests is based on which corresponding transport layer port the request was transported over.

For determining the link, the port sub-layer 206 performs a reverse lookup using the link-to-agent map 230. That is, the incoming request traffic has source agent identifiers as part of the coherency layer protocol messages, and each source agent identifier has a corresponding single link identifier.

The port sub-layer then writes the incoming request to the ingress buffer (not shown) in the identified link to route the request directly routed to the destination for ID-routed requests. Alternatively, the port sub-layer can determine whether or not the agent identified in the request is local to the chip or remote using an address-to-agent map that indicates local agents, and then route the request accordingly. The port sub-layer also reads requests from the ingress buffers of the links 208, ..., 210, 212, ..., 214 associated with the ports 216 and 218 and submits the requests to agent sub-layer 204.

FIG. 3 shows a flowchart of an exemplary process performed by an agent sub-layer of an agent. The agent sub-layer at block 302 receives or generates a request or response to another agent. For example, the agent sub-layer can receive from application circuitry a request to access a memory address. The agent sub-layer can also generate a response to a coherence request based on processing of a request received from the agent sub-layer of another agent. For example, the agent sub-layer can generate a response to a snoop request received from the agent sub-layer of another agent.

At block 304, the agent sub-layer determines the port associated with the address indicated by the request/response by looking up in the address-to-port map the port identifier associated with the address range that covers the address indicated by the request/response. At block 306, the agent sub-layer submits the request/response to the port sub-layer and indicates the port identifier.

The agent sub-layer can also receive a request from the agent of another agent sub-layer at block 308. In an implementation that performs cache coherence actions, the request received from another agent can be a snoop request, for example. At block 310, the agent sub-layer executes a hazard check based on the request. An example is a hazard check against an older CopyBack Request that was sent by the request agent for Cacheline A against a more-recent snoop request to that same request agent for the same Cacheline A. One example of the correct resolution of the hazard is that the request agent knows through the cache coherence protocol that the older CopyBack request has been made visible to the home agent and therefore the request agent's snoop response is a Miss. That is, the request agent responds indicating it no longer has a copy. Alternatively, the correct resolution of the hazard can also be that the request agent knows through the cache coherence protocol that the older CopyBack request has not been made visible to the home agent, and therefore, the request agent's snoop response is a Hit. That is, the request agent responds indicating still has a copy.

An example is a hazard check by a home agent is a hazard check against an older request-for-ownership that was sent by request agent X for Cacheline B against a more-recent request that was sent by request agent Y to that same home agent for the same Cacheline B. One example of the correct resolution of the hazard is that the home agent knows through the cache coherence protocol that the older request-for-ownership has completed at request agent X and request agent Y requests a shared copy so a snoop request is sent to request agent X indicating that X no longer has the only copy of Cacheline B and must move to either the Shared or Invalid state. Alternatively, the correct resolution of the hazard can also be that the home agent knows through the cache coherence protocol that the older request-for-ownership has completed at request agent X, and request agent Y also requests the only copy. Thus, a snoop request is sent to request agent X indicating X must give up ownership of Cacheline B and must move to the Invalid state. If request agent X already had been provided a shared copy, then the agent sub-layer does nothing as a result of the hazard check.

Based on the results of the hazard check, the agent sub-layer can do nothing or generate a request/response to the appropriate agent(s) by returning to block 302 to repeat the processing.

FIG. 4 shows a flowchart of processes 350 performed by the port sub-layer in processing egress requests. An egress request is a request to be output by the port sub-layer to the transport layer for communication to the port sub-layer of another agent. The port sub-layer performs the egress processing of requests from a local agent sub-layer as shown by blocks 352, 354, and 356 and performs egress processing of requests from the link layer as shown by blocks 358, 360, and 362.

At block 352, the port sub-layer receives a request from the local agent sub-layer. The request includes an address and a port identifier. At block 354, the port sub-layer determines the link associated with the address specified in the request by looking up in the address-to-link map associated with the port identifier communicated by the agent sub-layer, the link identifier associated with an address range that covers the address. The port sub-layer writes the request to the egress buffer of the identified link at block 356 and then returns to block 352.

The port sub-layer can be configured to support weakly ordered coherency protocol semantics or strongly ordered coherency protocol semantics. For weakly-ordered coherency semantics, the agent sub-layers transmit requests that force ordered execution of two out-of-order groups of transactions. For strongly-ordered coherency semantics, requests are input to and output from a link in FIFO order. Alternatively, depending on the particular strongly-ordered coherency semantics, requests are input to and output across all links in FIFO order.

At blocks 358, 360, and 362, the port sub-layer performs egress processing of requests in the egress buffers of the links. At block 358, the port sub-layer reads a request from the egress buffer of one of the links. If the port sub-layer maintains multiple ports and one or more of the ports has multiple associated links, the port sub-layer can service the ports and links in round-robin or weighted round-robin order, for example. The port sub-layer at block 360 determines the routing information for the request by reading the routing information from the chip ID map. At block 362, the port sub-layer submits the request and routing information to the transport layer and then returns to block 358.

FIG. 5 shows a flowchart of processes 370 performed by the port sub-layer in processing ingress requests. An ingress request is a request received by the port sub-layer via the transport layer from the port sub-layer of another agent. The port sub-layer performs the ingress processing of requests from the transport layer as shown by blocks 372, 374, and 376 and performs ingress processing of requests read from the ingress buffer as shown by blocks 378, 380, and 382.

At block 372 the port sub-layer receives a request from the transport layer. At block 374, the port sub-layer determines the link through which the request is to be communicated, and at block 376 writes the request to the ingress buffer of the identified link. After writing the request, the port sub-layer returns processing to block 372.

The port sub-layer performs ingress processing of requests read from the ingress buffer at blocks 378, 380, and 382. At block 378 the port sub-layer reads a request from the ingress buffer of one of the links. At block 380, the port sub-layer executes a hazard check. An example of a Hazard check for the port sub-layer of both a request agent and a home agent is between a snoop request and a copyback request. The hazard check processing differs based on the direction of the operations and the type of agent (request or home). The timing of a detected hazard affects the subsequent actions.

An example of a hazard check by the port sub-layer of a request agent is as follows. A request agent can have a hazard detect requirement for an outbound copyback request colliding with an inbound snoop request (from the home agent) for the same cacheline X. Subsequent actions also depend on the phase of the operation that the hazard/collision is detected. If the inbound snoop request is a hazard against an outbound copyback request that has not yet been sent to the home agent, the request agent's port sub-layer can choose one of two options. The port sub-layer of the request agent can cancel the copyback request and service the coherency protocol next-state action in the snoop response of the inbound snoop request, as if the copyback request had never occurred. Alternatively, the port sub-layer of the request agent can proceed with sending the copyback request and stall the servicing of the coherency protocol next-state action in the snoop response of the inbound snoop request, until acknowledgement has been received for the copyback request by the home agent.

If the inbound snoop request is a hazard against an outbound copyback request that has already been sent to the home agent, the request agent's port sub-layer stalls the servicing of the coherency protocol next-state action in the snoop response of the inbound snoop request until acknowledgement has been received for the copyback request by the home agent.

An example of a hazard check by the port sub-layer of home agent is as follows. A home agent can have a hazard detect requirement for inbound copyback request (from a request agent) colliding with an outbound snoop request for the same cacheline X. Subsequent actions also depend on the phase of the operation in which the hazard/collision is detected. For example, if the outbound snoop request that has already been sent to the request agent is a hazard against an inbound copyback request, the home agent must proceed with servicing the copyback request and send the request agent the indication of completion. The servicing of the copyback request and the indication of completion prevent a deadlock, because the request agent could as well be blocking servicing of the snoop request as described previously, pending receipt of an acknowledgement for the copyback request from the home agent.

At block 382, the port-sub-layer provides the request read from the ingress buffer to the agent specified in the request and then returns to block 378.

Figure 6:
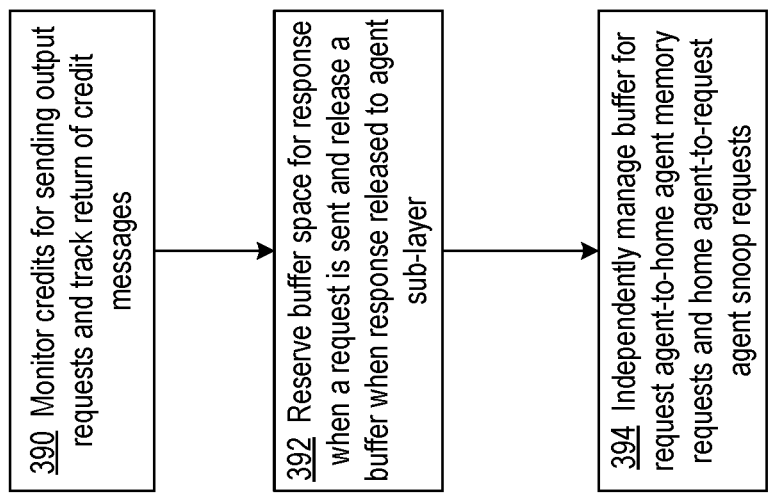
FIG. 6 shows a flowchart of an exemplary process performed by the link sub-layer.

FIG. 6 shows a flowchart of an exemplary process performed by the link sub-layer. A block 390, the link sub-layer manages the link buffers for requests between source/destination chips/agents. The link sub-layer monitors which outbound requests are valid/ready to send to the port sub-layer based on having sufficient credits available from the link partner, which is the link sub-layer of the source/destination. The link sub-layer also tracks return of credit messages from the link partner.

At block 392, the link sub-layer manages the buffers for responses between source/destination chips/agents. The link sub-layer implicitly reserves a buffer for responses when an outbound request is sent to the port sub-layer. The link sub-layer implicitly releases a buffer for new requests/responses when the inbound response from the port sub-layer has been provided to the agent sub-layer.

At block 394, the link sub-layer independently manages buffers for request agent-to-home agent memory requests and home agent-to-request agent snoop requests in order to avoid deadlocks within the coherency layer.

Figure 7:
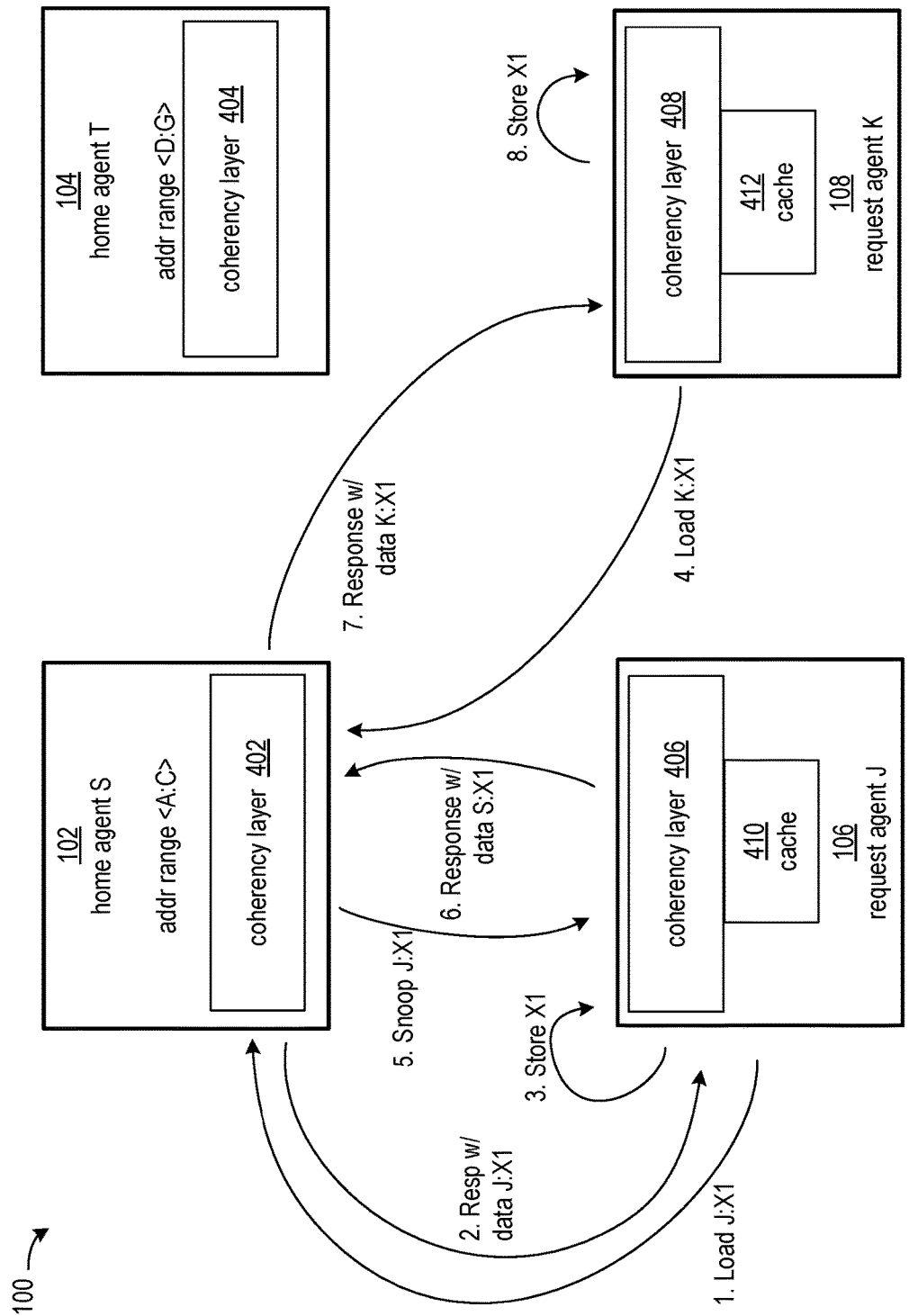
FIG. 7 illustrates a system in which cache coherency can be maintained by a sequence of actions is performed by coherency layers of agents in the systems.

FIG. 7 illustrates the system 100 in which cache coherency can be maintained by a sequence of actions is performed by coherency layers of agents in the systems. The system 100 includes multiple agents, examples of which are shown as agents 102, 104, 106, and 108. The request agents 106 and 108 include local caches, which are shown as caches 410 and 412, respectively. The coherency layers 406 and 408 in the request agents perform cache coherency actions for the respective local caches, and the coherency layers 402 and 404 in the home agents manage coherence requests throughout the system for different memory ranges. Each agent can include processing circuitry for accessing and manipulating data in the caches, including for example and without limitation, instruction processors and hardware accelerators. The processing circuitry is also referred to as a "compute engine."

The coherency layers 402, 404, 406, and 408 include circuitry that implements algorithms for maintaining cache coherency throughout the system 100, and the circuitry can include a microprocessor, programmable logic, or application-specific integrated circuitry or any suitable combination thereof. The algorithm implemented by the coherency layer in the home agent services/manages coherence requests for a range of memory addresses from request agents across the system. The cache coherence algorithm of the home agent also tracks the current residency and the coherency state of quanta (typically cache lines) that have been cached by request agents across the system.

The algorithm implemented by the coherency layer in the request agents services/manages coherence requests made by the request agent as well as servicing/managing snoop requests sent by the home agent. The cache coherency algorithm of the request agent also tracks the current coherency state of quanta that have been cached by the request agent.

FIG. 7 further illustrates a sequence of cache coherence requests numbered 1-7. Each of the coherence requests is processed through the coherency layer of the respective agent. Request 1 specifies a load with intent to modify cache line X1 by agent J (106) to home agent S (102). The load request originates from a compute engine(s) for which request agent J (RA-J) is executing the coherency layer agent algorithm (CLAA). Since initially, RA-J's cache does not have a copy of X1, the CLAA of RA-J issues a coherence request for X1.

Home agent S (102), which services/manages coherence requests for the range of memory addresses A-C, services the load request for X1 as per the home agent CLAA. Address X1 is within the address range A-C. Home agent S (HA-S) determines that no other RA has a copy of X1, and therefore routes the sole copy of X1 to RA-J. Since the load request indicates an intent to modify the contents of location X1, HA-S tracks that RA-J was provided the sole copy of X1.

As an example, the initial value of the data at location X1 is 0. The coherency layer 406 of RA-J on receiving the sole copy of X1 provides the contents of X1 to the compute engine of RA-J. The compute engine performs a function that adds the value 100 to the current value of X1 and updates the value of the data at location X1 to 100 as shown by request 3. The CLAA in coherency layer 406 tracks that it possesses the sole copy of X1, and therefore, does not inform HA-S that X1 contains a new value.

At a time after HA-S responds with request 2, RA-K (108) which is independently executing the CLAA of coherency layer 408 on behalf of the compute engine(s) represented by RA-K, issues coherency request 4, which specifies a load with intent to modify cache line X1.

The CLAA of HA-S, upon receiving the request 4 from RA-K, determines RA-J has the sole copy of X1 and determines that a snoop request 5 is to be routed to RA-J. The snoop request 5 issued to RA-J indicates that HA-S wants to regain ownership of X1 and no copy should be retained by RA-J.

The CLAA of RA-J services the snoop request 5 from HA-S, retrieves the updated value of 100 of X1, and issues coherence request 6 to HA-S. The coherence request 6 is a response that contains data indicating the value of X1. The CLAA of RA-J tracks that RA-J no longer retains a copy of X1.

After receiving the updated value of X1 from RA-J, the CLAA of HA-S issues coherence request 7, which provides the sole copy of X1 to RA-K, since RA-K had indicated an intent to modify the contents of X1. The CLAA of HA-S also updates locally stored cache coherency information to note that RA-K has the sole copy of X1.

The CLAA of RA-K provides the value 100 of X1 to the RA-K compute engine, which for example, adds the value 50 to X1 and updates the value of the data at location X1 to 150 as shown by coherence request 8. Since the CLAA of RA-K tracks that the sole copy of X1 is possessed by RA-K, RA-K also does not inform HA-S that X1 contains a new value.

The execution of the CLAA independently by each of the agents makes possible the functionally correct outcome, which is the final value of 150 at location X1. Because HA-S snooped X1 from RA-J, RA-J subsequently returned X1 with a value of 100, HA-S subsequently provided the new value of X1 to RA-K, and RA-K performed the add 50 function on the X1 value provided by HA-S, the correct final value of 150 was stored at X1.

As shown in FIG. 7, a system can include multiple request agents 106 and 108 and multiple home agents 102 and 104. Each of the home agents performs the CLAA for a particular range of memory addresses.

The example of FIG. 7 illustrates the serialization of events and hazard detection performed by agents as part of the locally executed CLAA. Regardless of the order in which the load requests of X1 by RA-J and RA-K occur, once HA-S chooses (in step 2) to first service RA-J's load request, HA-X detects the address hazard of RA-K's subsequent load request. HA-S therefore serializes all subsequent events. That is, HA-S executes steps 2, 5, 6, and 7 in that order for actions performed to location X1. Once RA-J receives the sole copy of X1 and updates X1 to a new value, RA-J detects the address hazard of the subsequent snoop request from HA-S seeking ownership of X1. RA-J therefore returns the updated value of X1.

The improvements provided by the disclosed approaches come from the independent layering of the coherency layer over any physical transport, and coherency layer routing from agent to agent independent of the transport layer protocol, transport layer routing, and transport layer topology. The CLAA performed by the coherence agent layer is not involved with most functions performed by the coherency link layer and coherency port layer. The example of FIG. 7 illustrates the improvements in the execution of the CLAA by the home agent and request agents.

These improvements are demonstrated in the example with the HAs and RAs performing actions in the execution of their CLAA. The CLAA performs its actions without regard to how RA-J's and RA-K's requests for X1 get routed to HA-S over the transport layer protocol/routing/topology. Routing is achieved through the RA-J's and RA-K's system address map (SAM), which specifies the destination on-chip port, and then by the port layer's SAM, where address decode routing information is used to resolve to the to the destination coherency port layer.

The CLAA performs its actions without regard to whether RA-J and RA-K have the buffers, flow control credits, and deadlock avoidance mechanisms to send the requests to HA-S and without regard to whether HA-S has the buffers, flow control credits, and deadlock avoidance mechanisms to receive the requests. Flow control and deadlock avoidance mechanisms are achieved by the coherency link layer algorithm (CLLA) independent of the transport layer's buffers, flow control credits, and deadlock avoidance mechanisms.

The CLAA performs its actions without regard to how data responses from HA-S to RA-J and RA-K, and the snoop request from HA-S to RA-J are routed. Chip identifier-based routing is achieved by the coherence port layer algorithm (CPLA), which implements a routing map ("ID map") of the coherency layer network to resolve to the destination coherency layer port.

Figure 8:
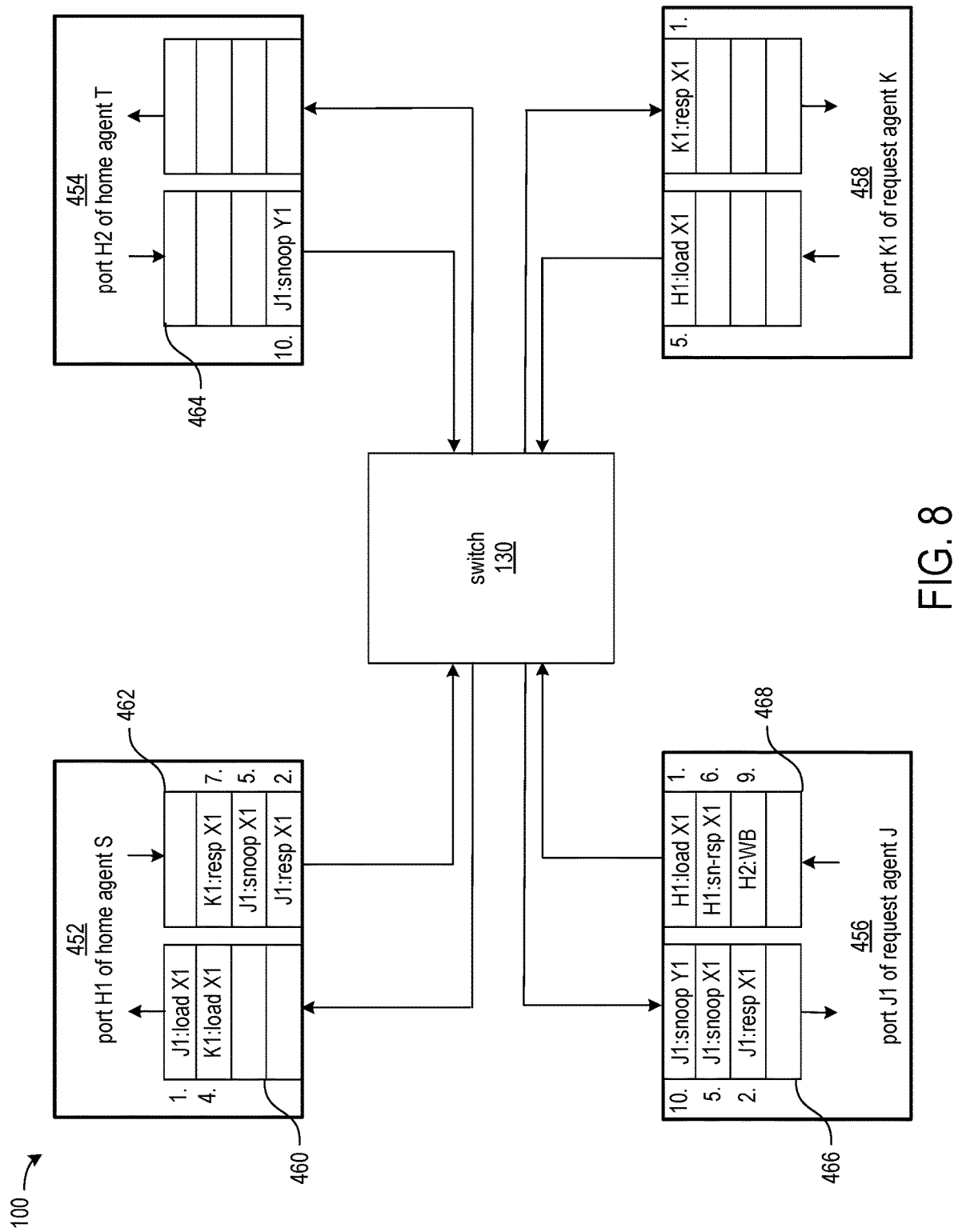
FIG. 8 shows the coherency port sub-layers in the agents of the system of FIG. 6.

The CLAA performs its actions without regard to the physical transport over which the coherency layer transactions travel. For example, the switch 130 in FIG. 8 is not visible to the coherency layer communications shown in FIG. 7. Nor does the coherency layer have visibility of the number of hops required for the coherency layer communications to reach their destinations, or the routing scheme used to direct the communications to the correct destination coherency layer.

FIG. 8 shows the coherency port sub-layers in the agents of system 100. The coherency port sub-layer interfaces between the coherency agent sub-layer and transport layer associated with the port sub-layer on the chip on which the sub-layers are co-located. The coherency layer port algorithm (CLPA) serializes coherency agent layer-to-coherency agent layer communications going through that port and in specific cases performs hazard detection. Block 452 represents port H1 of HA-S, block 454 represents port H2 of HA-T, block 456 represents port J1 of RA-J, and block 458 represents port K1 of RA-K.

The serialization function extends to coherency layer communications/transactions from a single coherency layer on a chip to one or more coherency layers on one or more other destination chips. The serialization function also extends to coherency layer communications/transactions from one or more coherency layers on one or more other source chips to a single destination coherency layer on the chip.

FIG. 8 provides additional details pertaining to, and extends the example of FIG. 7. FIG. 8 illustrates the actions of the coherency port layer in service of the coherency agent layer for that port. The example highlights the serialization of events and hazard detection performed by the respective CLAA of the ports and the sequence number correspond to the sequence numbers of FIG. 7.

Port H1 452 of HA-S serializes incoming requests from port J1 456 and port K1 458 by way of storing the requests in ingress buffer 460. The requests from port J1 and port K1 both reference cache line X1, and port H1 effectively serializes requests to the same cache line from the coherency layers of multiple sources RA-J and RA-K to the destination coherency layer of HA-S on the same chip that port H1 is located on. Output responses and snoop requests are serialized by the port H1 in egress buffer 462.

Port J1 performs hazard detection of an incoming snoop request (ingress buffer 466 and step 10) that originated at the coherency layer of HA-T and was sent from the egress buffer 464 of port H2. The snoop request was sent to RA-J for cache line Y1, the detected hazard being an already-sent WriteBack by the same RA-J for the same cache line Y1, as shown by step 9 and egress buffer 468. It will be recognized that the sequence of CLAA-initiated actions prior to the snoop request for Y1 being sent by HA-T, and prior to the WriteBack for Y1 being sent by RA-J, are analogous to the sequence of CLAA-initiated actions for X1 in FIG. 7.

The coherency port sub-layer and the CLPA are not involved with most functions performed by the coherency link sub-layer and coherency agent sub-layer. Nor are the coherency port sub-layer and the CLPA involved with most functions of the transport layer.

In execution of the CLPA, the HAs and RAs serialize coherency layer communications/transactions. For example, port H1 of HA-S serializes outgoing coherency layer communications/transactions from HA-S without regard to the number of destination ports (in this example, destination ports J1 and K1) to which the communications are directed.

The CLPA of the HAs and RAs do not require knowledge of the coherency actions that prompted the sending and receiving of the actions from the transport layer. For example, port H1 interfaces with the coherency layer HA-S without requiring knowledge of the coherency actions that prompted HA-S to send transactions, and similarly without requiring knowledge of the coherency actions that prompted the receipt of transactions from ports J1 and K1 over the transport layer.

The CLPA of the HAs and RAs do not require knowledge of the buffer space, flow control credits, or deadlock avoidance mechanisms of the sources or destinations. For example, port J1 sends transactions to and receives transactions from ports H1 and H2 without regard to whether port H1 and port H2 have the buffers, flow control credits, and deadlock avoidance mechanisms to send/receive transactions the transactions.

The CLPA of the HAs and RAs are not involved in the routing of packets through the switch 130. For example, port J1 attaches source/destination transport layer identifiers associated with the source/destination coherency layer IDs sent from that port. The CLPA is unaware how the transport layer protocol uses the identifiers to route the packet through the switch to reach the correct destinations (port H1 and port H2). The transport layer determines the route.

The CLPA of the HAs and RAs execute without regard to the number of ports in the system and the number of agents involved in coherence interactions. For example, port H1 interfaces with the coherency agent layer and the transport layer without regard to the number of ports 454, 456, and 458 there are in the system, without regard to the number of coherency agent sub-layers with which serialization operations are performed, and without regard to the transport layer protocol by which the messages/packets are sent from or received by port H1.

Although the example in FIG. 8 illustrates a single coherency port layer-coherency agent layer relation, the disclosed methods extend to all combinations, including multiple coherency port layer-single coherency agent layer relations, single coherency port layer-multiple coherency agent layer relations, and multiple coherency port layer-multiple coherency agent layer relations.

Figure 9:
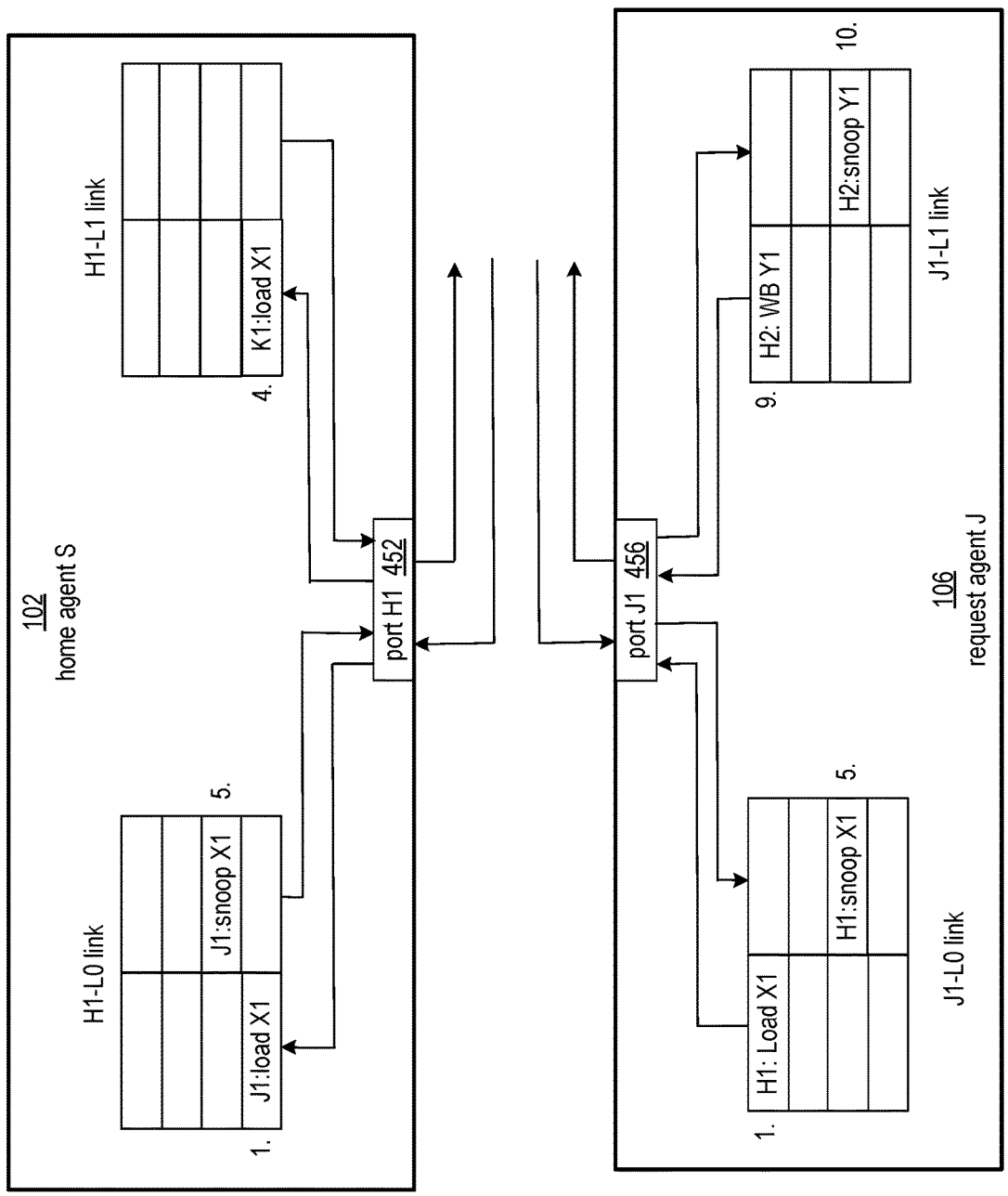
FIG. 9 shows the coherence link layers in a home agent S and a request agent J.

FIG. 9 shows the coherence link layers in home agent S (102) and request agent J (106). FIG. 9 starts with the example in FIG. 7 and illustrates the actions/algorithms of the coherency link sub-layer in service of transactions between the port and the coherency agent layer. The example illustrated in FIG. 9 highlights the flow control, virtual channel creation, and deadlock avoidance methods, performed by the coherency link sub-layer as part of its coherency link layer algorithm (CLLA).

Port H1 (block 452) has two coherency layer links. The H1-L0 link provides dedicated resources and virtual channels for agent-to-agent communications between HA-S and RA-J, and the H1-L1 link provides dedicated resources and virtual channels for agent-to-agent communications between HA-S and RA-K. Similarly, port J1 (block 456) has two links. The J1-L0 link provides dedicated resources and virtual channels for agent-to-agent communications from RA-J to HA-S, and the J1-L1 link provides dedicated resources and virtual channels for agent-to-agent communications from RA-J to HA-T. The links for pairs of agents are in effect, independent virtual channels. The independent virtual channels support scaling the number of links based on the number of source-destination agent-pairs.

Each link element has an ingress buffer and an egress buffer, which are used to prevent deadlocks that can arise during agent-to-agent communications. Link H1-L0 has an ingress buffer through which RA-J to HA-S requests are received, as shown by the J1:load X1 request of step 1. The egress buffer of link H1-L0 buffers requests from HA-S to RA-J, such as the J1:snoop X1 request of step 5.

The J1-L1 link also includes an ingress buffer and an egress buffer. The ingress buffer receives communications from HA-T, as illustrated by the H2:snoop Y1 request of step 10. The egress buffer of the J1-L1 link buffers requests from RA-J to HA-T, as illustrated by the H2:WB Y1 write back request of step 9.

Although the example in FIG. 8 illustrates a single agent-to-agent relation per link, the disclosed circuits and methods can be adapted to relations of multiple agents-to-single agent relations, single agent-to-multiple agents relations, and multiple agents-to-multiple agents relations.

Each link of a home agent controls the flow of communications in the ingress and egress buffers without regard to the number of source/destination ports or the number of source/destination request agents with which the home agent is communicating. For example, links H1-L0 and H1-L1 perform virtual channel flow control without regard to the number of source/destination ports, such as J1 and K1 in the example shown in FIG. 7 or the number of source/destination request agents, such as RA-J and RA-K, from which HA-S is receiving or to which HA-S is sending coherency requests.

The links also perform flow control for ingress and egress buffers without regard to the transport layer. For example, links H1-L0 and H1-L1 perform flow control without regard to the transport layer flow control through which messages are received from/sent to the transport layer ports associated with ports J1 and K1.

Each link of a request agent controls the flow of communications in the ingress and egress buffers without regard to the number of source/destination ports or the number of source/destination home agents with which the request agent is communicating. For example, links J1-L0 and J1-L1 control flow without regard to the number of source/destination ports, such as H1 and H2 or the number of source/destination home agents from which RA-J is receiving or to which RA-J is sending coherency requests.

Links J1-L0 and J1-I1 control flow without regard to the transport layer flow control through which messages are received from/sent to the transport layer ports associated with ports H1 and H2.

Figure 10:
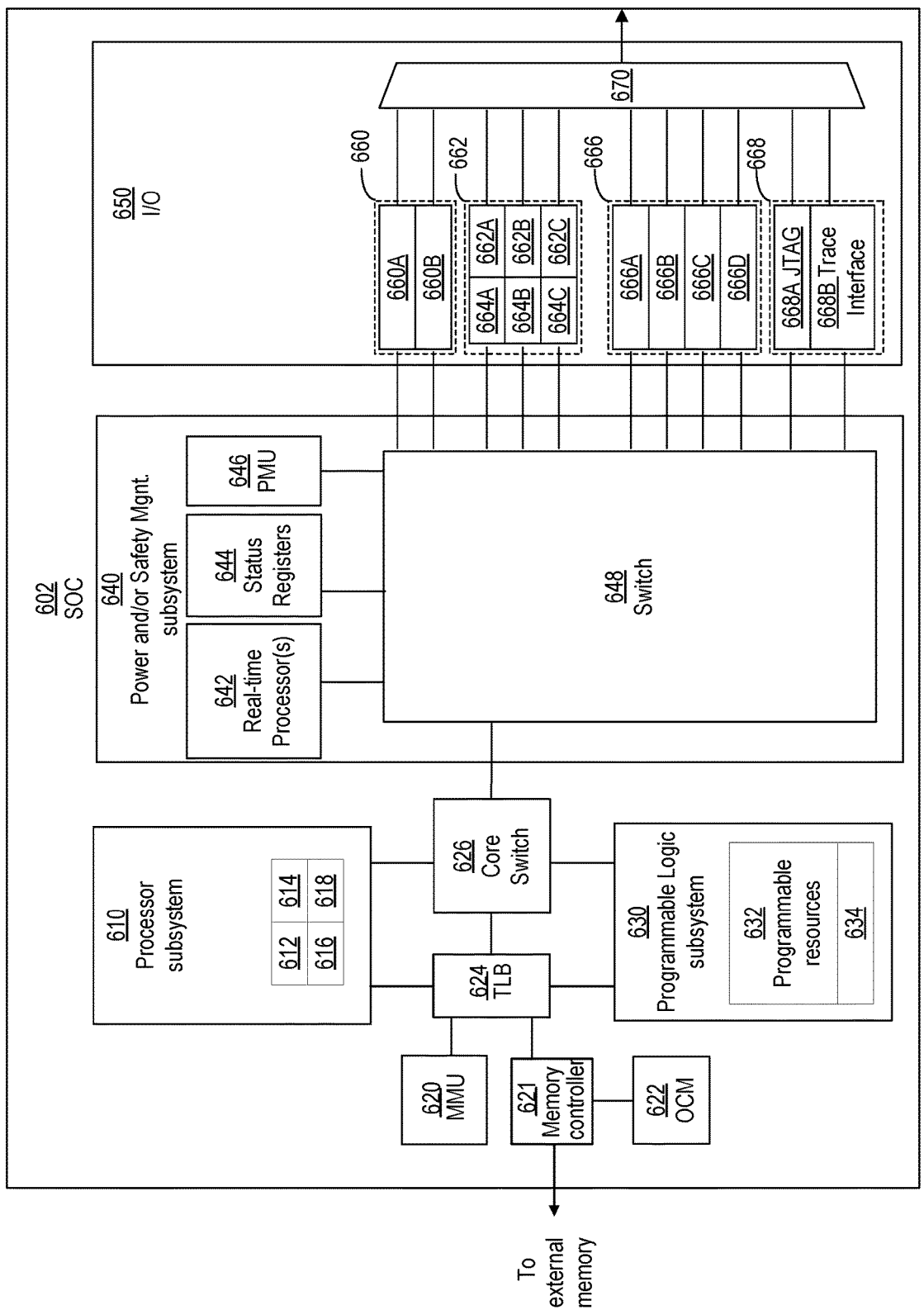
FIG. 10 shows an exemplary programmable IC that can be configured in accordance with the disclosed circuits and methods.

FIG. 10 shows an exemplary programmable IC 602 that can be configured in accordance with the disclosed circuits and methods. The programmable IC may also be referred to as a System On Chip (SOC), which includes a processor subsystem 610 and a programmable logic subsystem 630. The processor subsystem 610 may be programmed to implement a software portion of the user design, via execution of a user program. The program may be specified as part of a configuration data stream or may be retrieved from an on-chip or off-chip data storage device. The processor subsystem 610 may include various circuits 612, 614, 616, and 618 for executing one or more software programs. The circuits 612, 614, 616, and 618 may include, for example, one or more processor cores, floating point units (FPUs), an interrupt processing unit, on chip-memory, memory caches, and/or cache coherent interconnect.

The programmable logic subsystem 630 of the programmable IC 602 may be programmed to implement a hardware portion of a user design. For instance, the programmable logic subsystem may include a number of programmable resources 632, which may be programmed to implement a set of circuits specified in a configuration data stream. The programmable resources 632 include, for example, programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 632 may be programmed by loading a configuration data stream into the configuration memory cells, which define how the programmable interconnect circuits and programmable logic circuits are configured. For example, setting a configuration memory cell for a configurable latch to a first value may direct the configurable latch to operate as a single-edge-driven latch. Setting the configuration memory cell to a second value may direct the configurable latch to operate as a double-edge-driven latch. The collective states of the individual memory cells then determine the function of the programmable resources 632. The configuration data can be read from memory (e.g., from an external PROM) or written into the programmable IC 602 by an external device. In some implementations, a configuration controller 634 included in the programmable logic subsystem 630 may program the programmable resources, in response to powering on the programmable IC, by retrieving configuration data from a non-volatile memory coupled to the programmable IC and loading the configuration data into the configuration memory cells. In some other implementations, the configuration data may be loaded into the configuration memory cells by a start-up process executed by the processor subsystem 610.

The programmable IC 602 may include various circuits to interconnect the processor subsystem 610 with circuitry implemented within the programmable logic subsystem 630. In this example, the programmable IC 602 includes a core switch 626 that can route data signals between various data ports of the processor subsystem 610 and the programmable logic subsystem 630. The core switch 626 may also route data signals between either of the programmable logic or processing subsystems 610 and 630 and various other circuits of the programmable IC, such as an internal data bus. Alternatively or additionally, the processor subsystem 610 may include an interface to directly connect with the programmable logic subsystem—bypassing the core switch 626. Such an interface may be implemented, for example, using the AMBA AXI Protocol Specification (AXI) as published by ARM.

In some implementations, the processor subsystem 610 and the programmable logic subsystem 630 may also read or write to memory locations of an on-chip memory 622 or off-chip memory (not shown) via memory controller 621. The memory controller 621 can be implemented to communicate with one or more different types of memory circuits including, but not limited to, Double Data Rate (DDR) 2, DDR3, Low Power (LP) DDR2 types of memory, whether 16-bit, 32-bit, 16-bit with ECC, etc. The list of different memory types with which memory controller 621 is able to communicate is provided for purposes of illustration only and is not intended as a limitation or to be exhaustive. As shown in FIG. 10, the programmable IC 602 may include a memory management unit 620 and translation look-aside buffer 624 to translate virtual memory addresses used by the subsystems 610 and 630 to physical memory addresses used by the memory controller 621 to access specific memory locations.

The programmable IC may include an input/output (I/O) subsystem 650 for communication of data with external circuits. The I/O subsystem 650 may include various types of I/O devices or interfaces including for example, flash memory type I/O devices, higher performance I/O devices, lower performance interfaces, debugging I/O devices, and/or RAM I/O devices.

The I/O subsystem 650 may include one or more flash memory interfaces 660 illustrated as 660A and 660B. For example, one or more of flash memory interfaces 660 can be implemented as a Quad-Serial Peripheral Interface (QSPI) configured for 4-bit communication. One or more of flash memory interfaces 660 can be implemented as a parallel 8-bit NOR/SRAM type of interface. One or more of flash memory interfaces 660 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 650 can include one or more interfaces 662 providing a higher level of performance than flash memory interfaces 660. Each of interfaces 662A-662C can be coupled to a DMA controller 664A-664C respectively. For example, one or more of interfaces 662 can be implemented as a Universal Serial Bus (USB) type of interface. One or more of interfaces 662 can be implemented as a gigabit Ethernet type of interface. One or more of interfaces 662 can be implemented as a Secure Digital (SD) type of interface.

The I/O subsystem 650 may also include one or more interfaces 666 such as interfaces 666A-666D that provide a lower level of performance than interfaces 662. For example, one or more of interfaces 666 can be implemented as a General Purpose I/O (GPIO) type of interface. One or more of interfaces 666 can be implemented as a Universal Asynchronous Receiver/Transmitter (UART) type of interface. One or more of interfaces 666 can be implemented in the form of a Serial Peripheral Interface (SPI) bus type of interface. One or more of interfaces 666 can be implemented in the form of a Controller-Area-Network (CAN) type of interface and/or an inter-integrated circuit (I$^2$C) type of interface. One or more of interfaces 666 also can be implemented in the form of a timer type of interface.

The I/O subsystem 650 can include one or more debug interfaces 668 such as processor JTAG (PJTAG) interface 668A and a trace interface 668B. PJTAG interface 668A can provide an external debug interface for the programmable IC 602. Trace interface 668B can provide a port to receive debug, e.g., trace, information from the processor subsystem 610 or the programmable logic subsystem 630.

As shown, each of interfaces 660, 662, 666, and 668 can be coupled to a multiplexer 670. Multiplexer 670 provides a plurality of outputs that can be directly routed or coupled to external pins of the programmable IC 602, e.g., balls of the package within which the programmable IC 602 is disposed. For example, I/O pins of programmable IC 602 can be shared among interfaces 660, 662, 666, and 668. A user can configure multiplexer 670, via a configuration data stream to select which of interfaces 660-668 are to be used and, therefore, coupled to I/O pins of programmable IC 602 via multiplexer 670. The I/O subsystem 650, may also include a fabric multiplexer I/O (FMIO) interface (not shown) to connect interfaces 660-668 to programmable logic circuits of the programmable logic subsystem. Additionally or alternatively, the programmable logic subsystem 630 can be configured to implement one or more I/O circuits within programmable logic. In some implementations, the programmable IC 602 may also include a subsystem 640 having various circuits for power and/or safety management. For example, the subsystem 640 may include a power management unit 646 configured to monitor and maintain one or more voltage domains used to power the various subsystems of the programmable IC 602. In some implementations, the power management unit 646 may disable power of individual subsystems, when idle, to reduce power consumption, without disabling power to subsystems in use.

The subsystem 640 may also include safety circuits to monitor the status of the subsystems to ensure correct operation. For instance, the subsystem 640 may include one or more real-time processors 642 configured to monitor the status of the various subsystems (e.g., as indicated in status registers 644). The real-time processors 642 may be configured to perform a number of tasks in response to detecting errors. For example, for some errors, the real-time processors 642 may generate an alert in response to detecting an error. As another example, the real-time processors 642 may reset a subsystem to attempt to restore the subsystem to correct operation. The subsystem 640 includes a switch network 648 that may be used to interconnect various subsystems. For example, the switch network 648 may be configured to connect the various subsystems 610, 630, and 640 to various interfaces of the I/O subsystem 650. In some applications, the switch network 648 may also be used to isolate the real-time processors 642 from the subsystems that are to be monitored. Such isolation may be required by certain application standards (e.g., IEC-61508 SIL3 or ISO-26262 standards) to ensure that the real-time processors 642 are not affected by errors that occur in other subsystems.

In various implementations, the agent layer, link layer, and port layer are configured to enforce cache coherence. The port layer can be configured to serialize requests from the agent layer in enforcement of cache coherence. The agent layer can be configured to issue snoop requests and respond to snoop requests in enforcement of cache coherence.

In various implementations, the address-to-link identifier map can be associated with only the port layer identified by the port identifier and configured with a plurality of entries mapping different addresses to different link identifiers. The port layer can be further configured to support weakly ordered coherency protocol semantics. The port layer can be further configured to write requests to and read requests from each link in a first-in-first-out order.

Each link can include an egress buffer and an ingress buffer. The port layer can be further configured to write a request to the egress buffer of the one of the links identified by the link identifier, and read requests from the egress buffers of the links. The port layer can submit communications to the transport layer circuit based on the requests read from the egress buffers and extract link identifiers from communications received from the transport layer circuit. The port layer can write requests to the ingress buffers of the links identified by the link identifier extracted from the communications. The port layer reads requests from the ingress buffers and provides the requests read from the ingress buffers to the agent layer.

In various implementations, the link layer is disposed on an IC chip, the agent layer implements a plurality of agents on the IC chip, and the port layer implements a plurality of ports on the IC chip. At least one link of the plurality of links can be configured to buffer communications from and to the plurality of agents.

One or more links of the plurality of links can be configured to buffer communications between the agent layer and one and only one other agent layer.

A method includes establishing on each agent of a plurality of agents in a cache coherence network, a respective, dedicated link for buffering cache coherence communications between the agent and each other agent with which the agent exchanges cache coherence communications. Memory access requests are issued by respective agent layers of request agents of the plurality of agents to a home agent of the plurality of agents via the dedicated links. A snoop request is issued to the dedicated link for a request agent of the plurality of agents, by an agent layer of a home agent of the plurality of agents, in response to detecting a cache coherence hazard involving the request agent. Cache coherence communications are received by respective port layers of the plurality of agents, from transport layer circuitry of each of the plurality of agents, and cache coherence communications to and from the links are serialized by the respective port layers. The method attaches transport layer identifiers to cache coherence communications by the respective port layers, and the respective port layers submit cache coherence communications to the transport layer circuitry of the plurality of agents. An updated value is returned from a respective agent layer of a request agent of the plurality of agents to a home agent via the dedicated link in response to detecting a cache coherence hazard from a snoop request. In another aspect, method includes returning to a request agent via the dedicated link, a memory response and coherency state from a respective agent layer of a home agent of the plurality of agents in response to a memory request.

Another method includes looking-up a port identifier in an address-to-port identifier map by an agent layer in response to a request directed to another agent layer. The request includes an address and an agent identifier of the other agent layer. The agent layer submits the request to a port layer, and communications from and to the agent layer are buffered in links of a link layer. The port layer looks-up, in response to the request, a link identifier and chip identifier in an address-to-link map associated with the port identifier and writes the request to one of the links identified by the link identifier and associated with the chip identifier. The port layer reads requests from the links by the port layer and submits communications to a transport layer circuit based on the requests read from the links and associated chip identifiers. In another aspect, the address-to-link identifier map is associated with only the port layer identified by the port identifier and is configured with a plurality of entries mapping different addresses to different link identifiers.

Each link can include an egress buffer and an ingress buffer, and the method can further include writing the request to the egress buffer of the one of the links identified by the link identifier, reading requests from the egress buffers of the links, submitting communications to the transport layer circuit based on the requests read from the egress buffers, extracting link identifiers from communications received from the transport layer circuit, writing requests to the ingress buffers of the links identified by the link identifier extracted from the communications, reading requests from the ingress buffers, and providing the requests read from the ingress buffers to the agent layer.

The method can further include serializing requests written to the egress buffer by the port layer; and serializing requests written to the ingress buffer by the port layer. The method can include issuing snoop requests and responding to snoop requests in enforcement of cache coherence by the agent layer.

In other aspects, the method can include processing by the agent layer (204), requests from and requests to a plurality of agents implemented on an integrated circuit (IC) chip. The buffering can include buffering by the link layer on the integrated circuit chip. The submitting the request by the agent layer to the port layer can include indicating to the port layer a port identifier of one port of a plurality of ports on the IC chip. The buffering can further include buffering communications between the agent layer and one and only one other agent layer in one of the links.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for managing memory coherence independent of a transport protocol that connects memory requesters. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
an agent layer configured to:
look-up a port identifier in an address-to-port identifier map in response to a request directed to another agent layer, the request including an address and an agent identifier of the other agent layer, and
submit the request to a port layer;
a link layer that includes a plurality of links, wherein each link is configured to buffer communications from and to the agent layer; and
the port layer coupled to the agent layer and to the link layer, wherein the port layer is configured to:
look-up, in response to the request, a link identifier and chip identifier in an address-to-link map associated with the port identifier,
write the request to one of the links identified by the link identifier and associated with the chip identifier,
read requests from the links, and
submit communications to a transport layer circuit based on the requests read from the links and associated chip identifiers.

2. The circuit arrangement of claim 1, wherein the agent layer, link layer and port layer are configured to enforce cache coherence.

3. The circuit arrangement of claim 2, wherein the port layer is configured to serialize requests from the agent layer in enforcement of cache coherence.

4. The circuit arrangement of claim 3, wherein the agent layer is configured to issue snoop requests and respond to snoop requests in enforcement of cache coherence.

5. The circuit arrangement of claim 1, wherein the address-to-link identifier map is associated with only the port layer identified by the port identifier and is configured with a plurality of entries mapping different addresses to different link identifiers.

6. The circuit arrangement of claim 5, wherein the port layer is further configured to support weakly ordered coherency protocol semantics.

7. The circuit arrangement of claim 5, wherein the port layer is further configured to write requests to and read requests from each link in a first-in-first-out order.

8. The circuit arrangement of claim 7, wherein:
each link includes an egress buffer and an ingress buffer; and
the port layer is further configured to:
write the request to the egress buffer of the one of the links identified by the link identifier,
read requests from the egress buffers of the links,
submit communications to the transport layer circuit based on the requests read from the egress buffers,
extract link identifiers from communications received from the transport layer circuit,
write requests to the ingress buffers of the links identified by the link identifier extracted from the communications,
read requests from the ingress buffers, and
provide the requests read from the ingress buffers to the agent layer.

9. The circuit arrangement of claim 1, further comprising:
an integrated circuit (IC) chip;
wherein
the link layer is disposed on the IC chip;
the agent layer implements a plurality of agents on the IC chip; and
the port layer implements a plurality of ports on the IC chip.

10. The circuit arrangement of claim 1, wherein one or more links of the plurality of links is configured to buffer communications between the agent layer and one and only one other agent layer.

11. The circuit arrangement of claim 1, further comprising:
an integrated circuit (IC) chip;
wherein
the link layer is disposed on the IC chip;
the agent layer implements a plurality of agents on the IC chip;
the port layer is one of a plurality of port layers disposed on the IC chip; and
at least one link of the plurality of links is configured to buffer communications from and to the plurality of agents.

12. A method comprising:
establishing on each agent of a plurality of agents in a cache coherence network, a respective, dedicated link for buffering cache coherence communications between the agent and each other agent with which the agent exchanges cache coherence communications;
issuing memory access requests by respective agent layers of request agents of the plurality of agents to a home agent of the plurality of agents via the dedicated links;
issuing a snoop request to the dedicated link for a request agent of the plurality of agents, by an agent layer of a home agent of the plurality of agents, in response to detecting a cache coherence hazard involving the request agent;
receiving cache coherence communications by respective port layers of the plurality of agents, from transport layer circuitry of each of the plurality of agents;
serializing cache coherence communications to and from the links by the respective port layers;
attaching transport layer identifiers to cache coherence communications by the respective port layers;
submitting cache coherence communications by the respective port layers to the transport layer circuitry of the plurality of agents; and
returning an updated value from a respective agent layer of a request agent of the plurality of agents to a home agent via the dedicated link, in response to detecting a cache coherence hazard from a snoop request.

13. The method of claim 12, further comprising returning to a request agent via the dedicated link, a memory response and coherency state from a respective agent layer of a home agent of the plurality of agents in response to a memory request.

14. A method, comprising
looking-up a port identifier in an address-to-port identifier map by an agent layer in response to a request directed to another agent layer, the request including an address and an agent identifier of the other agent layer, and
submitting the request by the agent layer to a port layer;
buffering communications from and to the agent layer in links of a link layer;
looking-up by the port layer in response to the request, a link identifier and chip identifier in an address-to-link map associated with the port identifier;
writing the request to one of the links identified by the link identifier and associated with the chip identifier;
reading requests from the links by the port layer; and
submitting communications to a transport layer circuit based on the requests read from the links and associated chip identifiers.

15. The method of claim 14, wherein the address-to-link identifier map is associated with only the port layer identified by the port identifier and is configured with a plurality of entries mapping different addresses to different link identifiers.

16. The method of claim 15, wherein each link includes an egress buffer and an ingress buffer, and the method further comprising:
   writing the request to the egress buffer of the one of the links identified by the link identifier;
   reading requests from the egress buffers of the links;
   submitting communications to the transport layer circuit based on the requests read from the egress buffers;
   extracting link identifiers from communications received from the transport layer circuit;
   writing requests to the ingress buffers of the links identified by the link identifier extracted from the communications;
   reading requests from the ingress buffers; and
   providing the requests read from the ingress buffers to the agent layer.

17. The method of claim 16, further comprising:
   serializing requests written to the egress buffer by the port layer; and
   serializing requests written to the ingress buffer by the port layer.

18. The method of claim 17, further comprising issuing snoop requests and responding to snoop requests in enforcement of cache coherence by the agent layer.

19. The method of claim 14, further comprising:
   processing by the agent layer, requests from and requests to a plurality of agents implemented on an integrated circuit (IC) chip;
   wherein the buffering includes buffering by the link layer on the integrated circuit chip; and
   wherein the submitting the request by the agent layer to the port layer includes indicating to the port layer a port identifier of one port of a plurality of ports on the IC chip.

20. The method of claim 14, wherein the buffering includes buffering communications between the agent layer and one and only one other agent layer in one of the links.

* * * * *